United States Patent [19]
Will et al.

[11] 3,786,403
[45] Jan. 15, 1974

[54] UNDERWATER ACOUSTICAL DETECTION SYSTEM

[75] Inventors: Albert S. Will, Bethesda; Sylvan Wolf, College Park; William L. Barnum, Takoma Park, all of Md.

[73] Assignee: The United States of America as represented by the Secretary of the Navy, Washington, D.C.

[22] Filed: May 10, 1968

[21] Appl. No.: 729,143

[52] U.S. Cl. .......................................... 340/2, 9/8 R
[51] Int. Cl. ............................................ G01h 9/00
[58] Field of Search ....................... 340/2, 3 R, 3 T, 340/6 R, 16 R; 9/8 R

[56] References Cited
UNITED STATES PATENTS

| | | | |
|---|---|---|---|
| 2,422,337 | 6/1947 | Chilowsky | 340/2 |
| 3,222,634 | 12/1965 | Foster | 340/3 |
| 3,275,976 | 9/1966 | Farmer | 340/2 |

FOREIGN PATENTS OR APPLICATIONS

| | | | |
|---|---|---|---|
| 728,451 | 2/1966 | Canada | 340/2 |

OTHER PUBLICATIONS
Popular Mechanics, June 1960, page 150.

*Primary Examiner*—Richard A. Farley
*Attorney*—R. S. Sciascia, J. A. Cooke and J. C. Goldstein

[57] ABSTRACT

An air-launched multiple deployment depth sonobuoy having mechanical apparatus and electrical circuitry for intermittently lowering the sonobuoy to a plurality of predetermined depths. The mechanical apparatus includes a cable wrapped around a free wheeling roller which may be braked by a motor-driven, spring-loaded clutch while a second roller urges the cable against the free wheeling roller by means of a second spring-loaded clutch driven by the motor of the first clutch. The electrical circuitry includes a plurality of switch banks responsive to rotation of a motor shaft, a plurality of hydrostatic pressure responsive switches, a plurality of limit switches, and a plurality of relays. Time delay circuits including electrically energizable explosive squibs are also included to provide appropriate separation functions.

10 Claims, 8 Drawing Figures

Albert S. Will
Sylvan Wolf
Wm. L. Barnum
INVENTORS

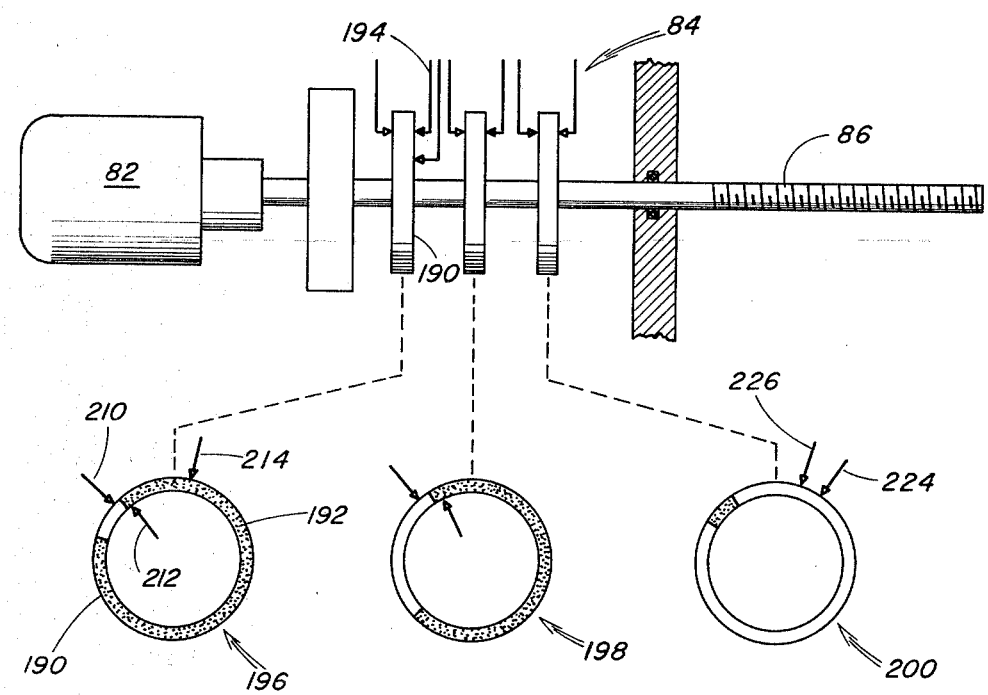
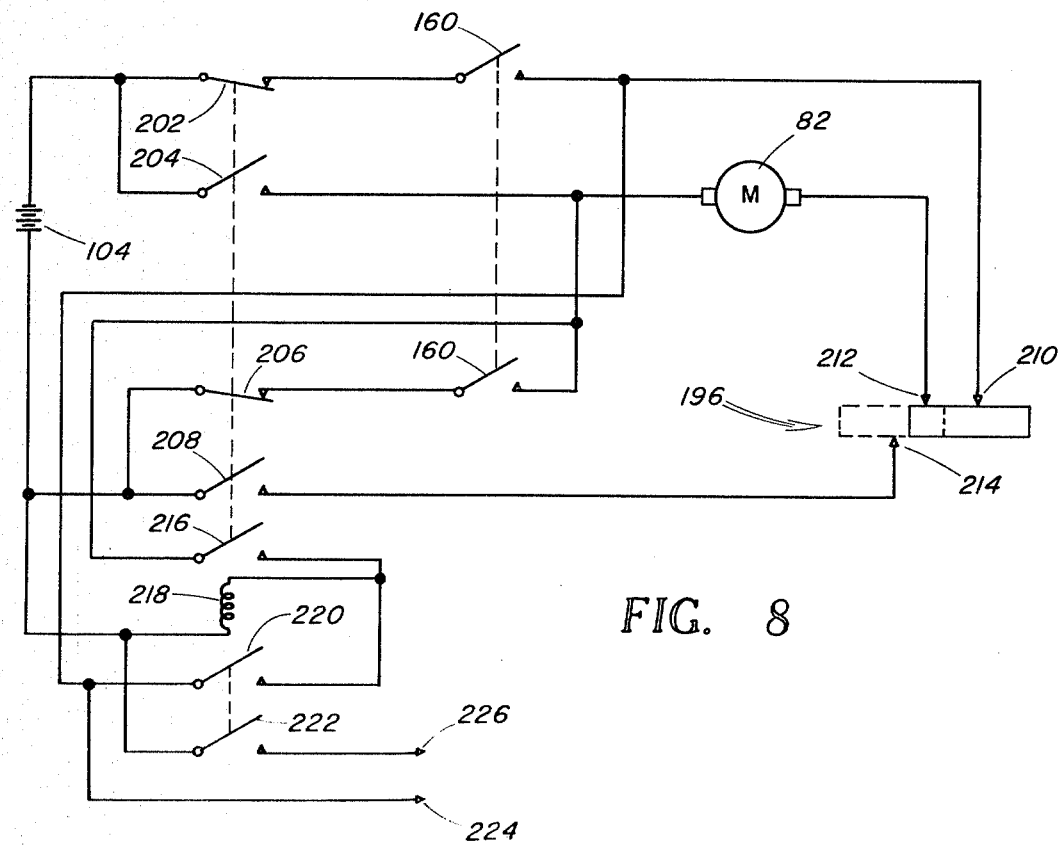
FIG. 7
FIG. 8

UNDERWATER ACOUSTICAL DETECTION SYSTEM

BACKGROUND OF THE INVENTION

This invention relates generally to long range sound navigation ranging (SONAR) detection, surveillance and communication in the deep sea, and more particularly to an underwater acoustical detection system having a multiple deployment depth sonobuoy which utilizes the caustics and convergence zones known to exist in deep water sound transmission.

The existence of convergence zones is a well known aspect of sound transmission in the deep sea. These zones are narrow rings formed by the intersection of the sea surface with a succession of caustics caused by the peculiar velocity profile of the sea, and they are utilized by high power near-surface SONAR systems which have a sufficiently high figure of merit to exploit their existence.

Convergence zones were discovered during World War II when ray diagrams were first drawn over long ranges. For many years the existence of convergence zones was not publicized though it was evident in almost any ray diagram of long range deep sea sound propagation. In an article entitled "Long Range Sound Propagation in the Deep Ocean" in the Journal of the Acoustical Society of America, Volume 33, page 456, 1956, F. E. Hale summarized the essential features of convergence zones, as well as the amount of convergence gain that had been observed in field measurements. However, in all of this work, both the source and the receiver were positioned at depths no deeper than can be reached by submarines; hence, when, but only when, both ends of the transmission path are relatively near the sea surface in deep water, convergence zone transmission has long been recognized and understood.

By contrast, comparatively little work had been done on transmission between a source and a receiver at different deep depths in the sea. As a result, the existence of deep convergence zones and their behavior as the receiver changes its depth between the surface and bottom were relatively unknonw prior to the publication of an article entitled "Caustics and Convergence Zones in Deep-Water Sound Transmission" in the Journal of the Acoustical Society of America, Volume 38, page 348, 1965, by R. J. Urick. On the basis of these and other studies, a search-in-depth concept of acoustic ranging (SIDECAR) has been formulated to exploit the phenomena of deep-water convergence zones.

Sound responsive detection buoys, or sonobuoys, have been used in the past in attacking enemy submarines known to be within a reasonably restricted area, and have proved valuable in such use. In general, these buoys are dropped from airplanes and utilize a battery powered radio transmitter which is modulated by a hydrophone to enable an operator in an attacking airplane to hear the ocean noises at the location of the buoy and to thus locate the enemy submarine.

Most sonobuoys presently used for this purpose operate at only fixed depths of between 60 and 15 hundred feet. At these depths they are restricted in their performance by the acoustic paths existing in deep water which limit the range of operation to comparatively short distances. At the more extreme depths of 12,000 feet and below, various active or echo-type buoys that are now being developed, such as the sonobuoy system disclosed in U.S. Patent Application Ser. No. 545,209, filed on Apr. 19, 1966, by A. S. Will et al, utilize direct acoustic paths, otherwise known as reliable acoustic paths, but these buoys are similarly somewhat limited in range by the acoustic characteristics of the deep sea. Because of these path limitations, existing sonobuoys provide only a narrowly restricted range coverage that greatly limits their usefulness in long range detection, communication, and surveillance applications.

Briefly, SIDECAR is a concept that utilizes deep, favorable, acoustic paths in the deep sea. The propagation of sound in sea water is known to occur along rays which are subject to refraction by variations in sound velocity. In most areas of the oceans, the velocity of sound varies directly with the pressure and temperature of the water, the pressure increasing with the depth. The temperature varies over a wide range near the surface and decreases rather rapidly to a temperature of near freezing several thousand feet below the surface. Therefore, near the surface of the ocean, the temperature of the water affects the propagation rate more than the pressure so that the propagation rate becomes slower as the depth increases at any given point. Under these conditions, the lower edge of the sound wave moves more slowly than the upper edge so that the sound wave is progressively refracted toward the bottom of the ocean and does not move outward in a straight line.

At a depth of several thousand feet, the temperature becomes quite low and thereafter decreases very slowly, so that the increasing pressure with depth thereafter becomes predominant and increases the propagation rate. The sound waves initiated near the surface are thus rerefracted toward the surface.

As a result of the rays being refracted to form continuous reversely-bent paths which extend in a generally horizontal direction, little loss of energy occurs. This feature persists to a useful extent even though there occurs considerable deviation in direction. Sound signals occurring along such reversely-bent rays may, in this way, be transmitted over distances of several thousand miles.

SIDECAR utilizes those convergence zone paths, which involve no reflections from the sea surface or bottom, over which the transmission loss is less than it would be under free-field conditions. Through these convergence zone paths, all ranges within the first convergence zone can be reached acoustically, over highly favorable paths from a single fixed location in the deep sea by appropriate selection of depth. By increasing the depth from a shallow initial depth, the shadow areas or gaps within the first convergence zone can be virtually eliminated since the inner half of the first convergence zone moves inward and the direct acoustic path moves outward until the two coalesce or merge. If the depth is allowed to vary, a target at any radial range within the first convergence zone can be reached via a convergence zone path so long as the source and receiver lie at some particular depth within the deep sound channel which is generally present in deep water areas. The deep sound channel is that portion of the deep sea between a depth at or near the surface and a greater depth at or near the bottom at which sound will propagate at the same velocity as the first mentioned depth. It is apparent from any deep water velocity profile that the minimum velocity characteristics exist within the deep sound channel thusly defined. For a more detailed analysis of the acoustical theory behind SIDECAR, see the aforementioned article by Urick. Although SIDECAR is limited to deep water applications in which the convergence zone paths exist (i.e., deep enough to provide the deep sound channel), the principle advantages are greatly increased range coverage and continual coverage over that range within the deep sound channel thus essentially eliminating any shadow areas or gaps in which an enemy target might hide.

Heretofore, several systems have been exploited to implement SIDECAR. Each of these systems contemplates deployment by a fixed wing aircraft or possibly a helicopter and uses a buoyed radio transmitter as a data link.

The simplest of the prior art SIDECAR systems utilized a single line hydrophone which descends through the water from the surface buoy, such as the free-falling sonobuoy disclosed in U.S. Patent Application Ser. No. 452,460, filed on Apr. 28, 1965, by Urick et al, and of common assignee herewith. A second SIDECAR system utilizes a string of such vertically directional line hydrophones vertically spaced uniformly apart and suspended from a surface float to a desired depth, such as the deep hydrophone string disclosed in U.S. Patent Application Ser. No. 502,713, filed on Oct. 22, 1965, by Urick, and also of common assignee herewith. A third system, which is a variation of the latter, utilizes a bottom anchored string of line hydrophones with the same uniform vertical spacing, but held in an upright position by a submerged float. Each of these SIDECAR systems is "passive" in that it merely listens for noises generated by enemy targets without generating any acoustical signal of its own.

Although these systems have proved operationally feasible to implement SIDECAR, several problems have been encountered which render further improvements desirable. In the single free-falling hydrophone system the rapid speed of descent causes flow noises which limit the performance of the system. Moreover, a second look at the target at any particular depth is impossible with the free-falling hydrophone as it cannot be recovered from the depth to which it sinks. Furthermore, the expendable nature of this hydrophone system makes it costly. The string of line hydrophones, whether supported by a surface or submerged float, eliminates the noise problem by not operating during descent. However, deployment time before any monitoring may begin in this system is greater, and the system is expensive in that several hydrophone units are required to implement SIDECAR. Moreover, horizontal displacement of the hydrophones which may occur due to currents presents a major problem since such displacement changes the "look" angle of the separate hydrophones unless each is adequately and separately gimbled to ensure a vertical orientation. Moreover, each of these systems, being "passive" in nature, works fairly well against a noisy target, such as a moving snorkelling submarine or a nuclear submarine moving at moderate to high speeds, and provides a detection range of 30 miles or more under good acoustical conditions against such targets. However, an extremely quiet target or an acoustically noisy background reduces this value to very short ranges of the order of 3 miles which defeats the broad SIDECAR capability of long range detection.

Accordingly, one object of the present invention is the provision of a new system for long range sound navigation ranging detection, surveillance, and communication in deep sea.

Another object is to provide an improved long range SONAR system for exploiting the deep water favorable acoustic paths, or convergence zones, defined by caustics.

Yet another object of the invention is the provision of a long range, deep water SONAR system providing continual coverage over its range within the deep sound channel so as to virtually eliminate all shadow areas or gaps in which a target might hide.

Still another object is to provide a long range, deep water SONAR system having a minimal amount of self-generated noise.

A further object of the present invention is the provision of a long range, deep water SONAR system which may be recovered from the ocean after use thereof.

A still further object is to provide a long range, deep water SONAR system which may be effectively deployed in a short time.

Another still further object of the present invention is the provision of a long range, deep water SONAR system which is not severely affected by ocean currents.

One more object is to provide an active or echo-type long range, deep water SONAR system utilizing the convergence zone paths existing in deep water sound transmission, which system is capable of active or echo-type sensing either exclusively or in combination with passive or listening sensing.

A final object of the present invention is to provide a new and improved method for long range sound navigation ranging detection, surveillance, and communication in deep sea.

Briefly, in accordance with one embodiment of this invention, these and other objects are attained by providing, in an underwater acoustical detection system, a multiple deployment depth sonobuoy having means associated therewith for intermittently suspending the submerged portion of the sonobuoy a a plurality of discrete ocean depths.

A more complete appreciation of the invention and many of the attendant advantages thereof will be readily appreciated as the same becomes better understood by reference to the following detailed description when considered in connection with the accompanying drawings wherein:

FIG. 7 is a schematic diagram of the array actuator switching bank; and

FIG. 8 is a schematic diagram of the array actuator electrical control circuit.

DESCRIPTION OF THE PREFERRED EMBODIMENT

Figure 1:
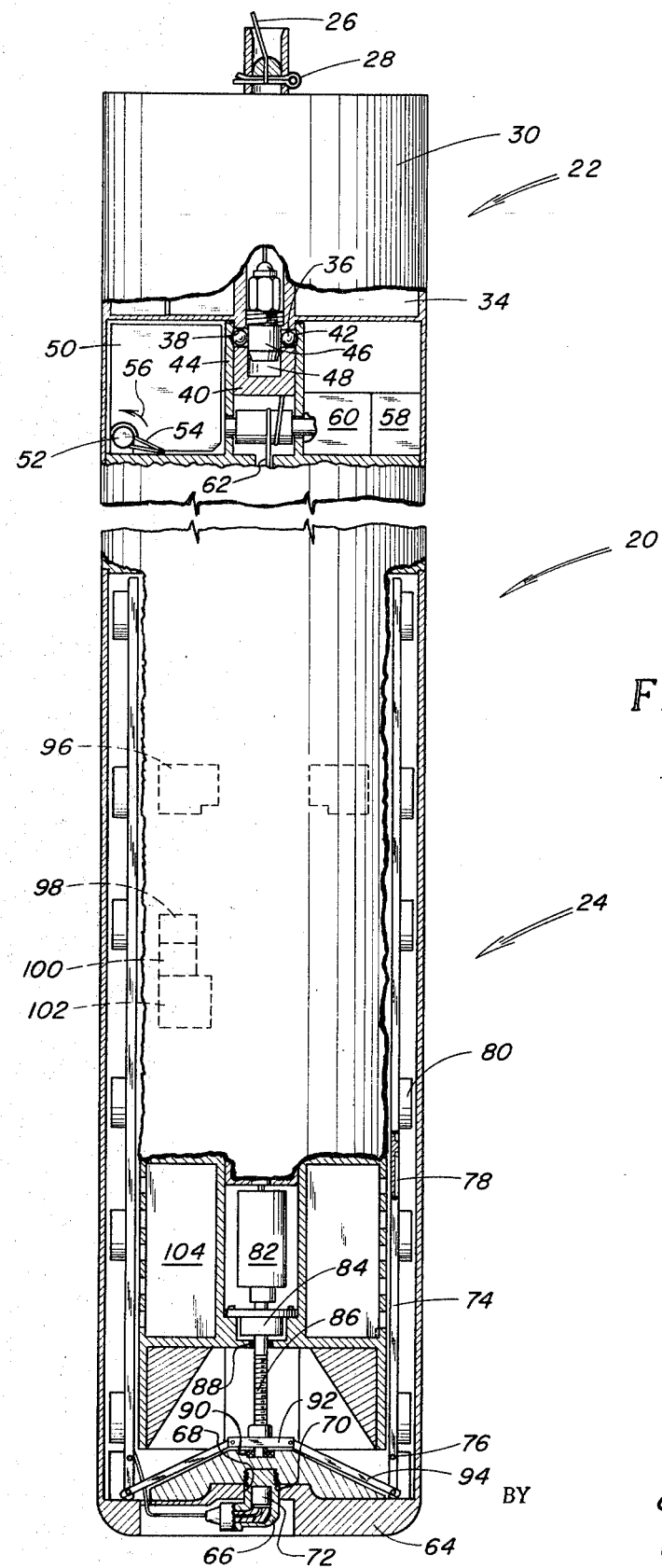
FIG. 1 is a plan view, partly in section, of the multiple deployment depth sonobuoy according to present invention.

Referring now to the drawings wherein like reference characters designate identical or corresponding parts throughout the several views, and more particularly to FIG. 1 thereof wherein the multiple deployment depth sonobuoy of the present invention is designated generally by reference numeral 20 and comprises a surface sub-assembly 22 and a deep sub-assembly 24. The surface sub-assembly includes a lanyard 26 held in place prior to launching by a safety key 28. Lanyard 26 serves to hold a cannister 30 is place until the sonobuoy is launched. Inside the cannister is a parafloat (not shown) and a transmitter command receiver 34 which may contain its own power souce. The surface sub-assembly is secured to the deep sub-assembly by means of a plurality of ball detents 36 extending through bores 38 in a transmitter command receiver housing 40 and into a circumferential groove 42 in a deep sub-assembly housing 44. The ball detents are held in place by an electrically energizable squib 46 which, when activated, will generate gases in a cavity 48 within housing 40 thereby causing the squib to shear out of its threads and release ball detents 36 so as to enable the surface sub-assembly to be separated from the deep sub-assembly.

A plurality of fins 50 are pivotally mounted to deep sub-assembly housing 44 by pins 52 and are biased by torsion spring 54 so as to rotate in the direction of arrowhead 56 upon release by the surface sub-assembly housing. A sea water battery 58 and a motor cable gripper assembly 60 are secured to the surface end of the deep sub-assembly and a transmitting and supporting cable 62 is secured to the transmitter command receiver and the deep sub-assembly.

The deep sub-assembly is protected prior to deployment by an array fairing 64 which is secured to the deep sub-assembly housing by an explosive bolt 66 having a weakened portion 68 in the form of a V-groove 70 and containing an electrically energizable, gas generating explosive squib 72.

A plurality of hydrophone arms 74 are radially disposed around the sonobuoy and are pivotally mounted thereto as by pin connection 76. Attached to the hydrophone arms are a plurality of pivotally mounted hydrophone staves 78 to which a plurality of hydrophones 80 are fixedly secured. Any conventional latching means (not shown) may be used to hold the hydrophone staves in the closed configuration as shown in FIG. 1 and then to release them when the hydrophone arms are rotated to the horizontal position as will be described hereinafter. A drive motor 82 is secured by conventional means to the deep sub-assembly housing and drives a gear reducer and cam switch assembly 84 and a lead screw 86 of a jack screw lever mechanism. A fluid tight seal is maintained between the deep sub-assembly housing and the lead screw by conventional sealing means, such as O-ring 88, and the lead screw is supported at its lower extremity by a conventional bearing 90. An internally threaded follower 92 is threaded onto the lead screw and a plurality of pivot arms 94 are pivotally mounted at each extremity thereof to follower 92 and hydrophone arms 74. For reasons which will become more apparent hereinafter, there is also positioned within the deep sub-assembly a depth sensing switch assembly 96, a tone generator 98, an array fairing release circuit 100, a relay command actuator 102, and a sea water battery 104.

Figure 2:
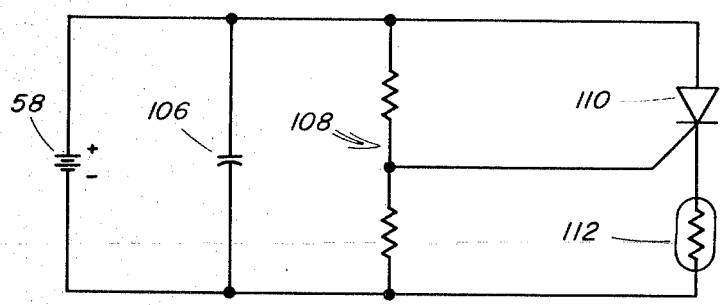
FIG. 2 is a schematic diagram of the transmitter-deep sub-assembly separation circuit of the present invention.

Referring now to FIG. 2, the surface sub-assembly and deep sub-assembly separation circuit comprises sea water battery 58 connected across a storage capacitor 106. A voltage divider 108 is also connected across the storage capacitor. The anode of a silicon controlled rectifier 110 is connected to one end of voltage divider 108 and the gate is connected to the center tap of the voltage divider. A conventional squib resistor 112 is connected between the cathode of the silicon controlled rectifier and the other end of the voltage divider.

Figure 3:
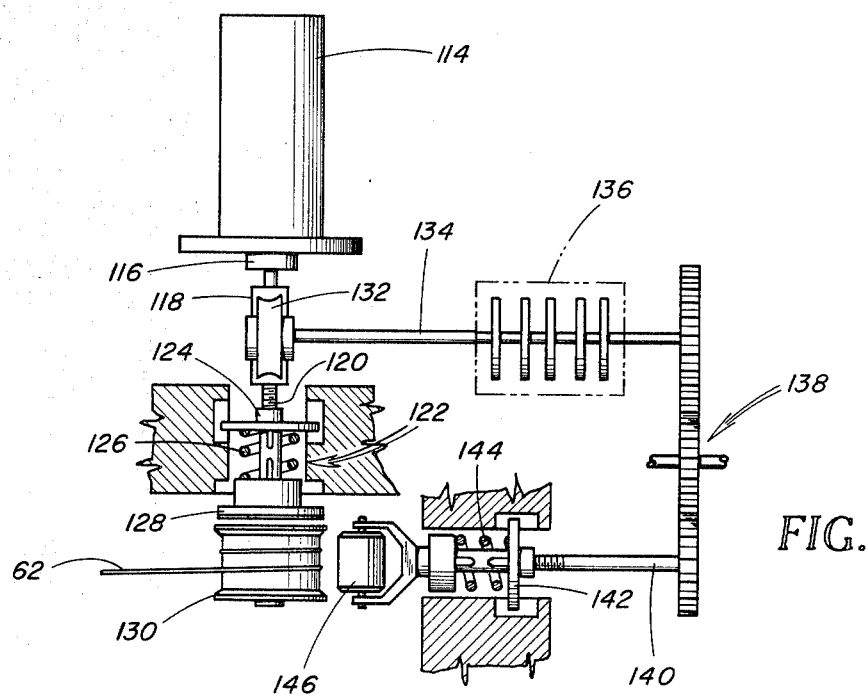
FIG. 3 is a plan view of a preferred embodiment of the cable gripper assembly according to the present invention.

Referring now to FIG. 3, motor and cable gripper assembly 60 is shown in detail. A reversible D.C. motor 114, via a planetary gear reducer 116, drives a worm 118 and a lead screw 120 of a clutch assembly 122. A thread follower 124 is threaded onto lead screw 120 and, via a spring 126, controls the pressure applied by a clutch plate 128 to a free wheeling roller 130 about which cable 62 is wound. Worm 118 drives a worm gear 132 to which a shaft 134 is fixedly secured. Rotation of shaft 134 causes actuation of a switch bank 136, a gear train 138, and a threaded lead screw shaft 140. A threaded follower 142 is threaded onto lead screw shaft 140 and, via a spring 144, controls the amount of pressure supplied by a free wheeling idler roller 146 to cable 62 and roller 130.

Figure 4:
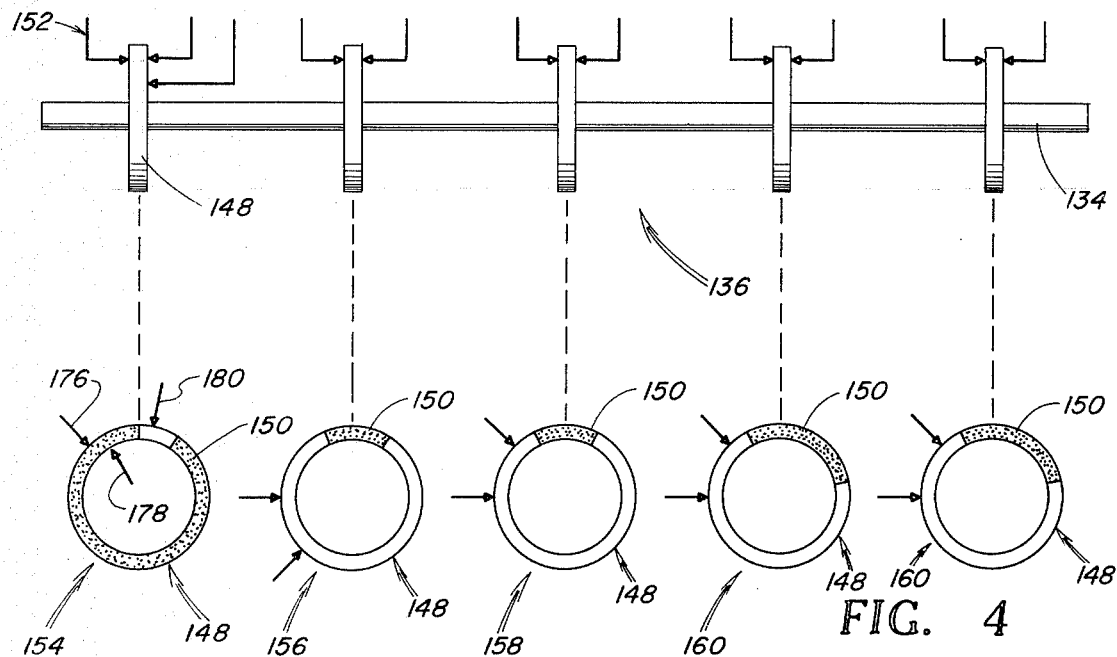
FIG. 4 is a schematic diagram of the cable gripper switching bank of the present invention.

Referring now to FIG. 4, the details of switch bank 136 are more clearly illustrated. Fixedly secured to shaft 134 for rotation therewith are a plurality of circular discs 148 made of or coated with an electrical insulating material. Around a selected portion of the circumference of each disc there is deposited an electrical conductor 150. A plurality of contact brushes 152 are positioned adjacent the discs so that the discs may selectively open and close the contacts upon rotation of shaft 136. Each disc and its adjacent contact brushes form a switch. These switches may be referred to as limit switch 154, array fairing ejector power switch 156, tone generator power switch 158, and a pair of array actuator power switches 160. The purpose of the switches will become more apparent hereinafter.

Figure 5:
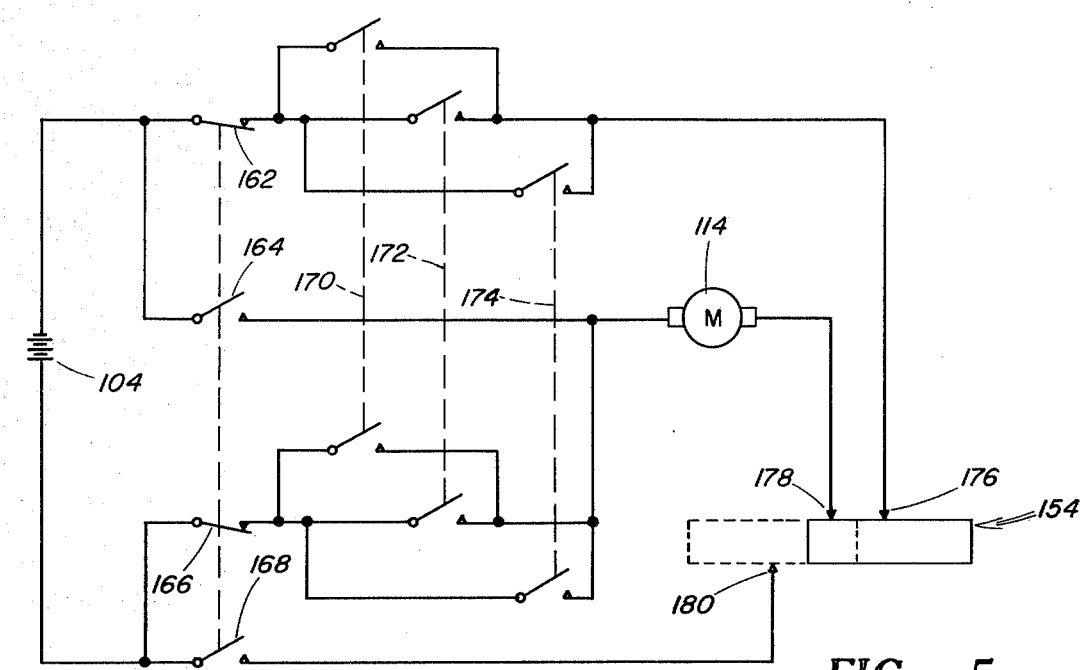
FIG. 5 is a schematic diagram of the cable gripper electrical control circuit.

FIG. 5 shows the electrical schematic diagram for motor and cable gripper assembly 60. Each terminal of sea water battery 104 is connected to a pair of contacts 162, 164 and 166, 168 of a holding relay having a holding coil (not shown). It should be noted that contacts 162 and 166 are normally closed and that contacts 164 and 168 are normally open. Normally closed contacts 162 and 166 are connected to one terminal of one of the poles of three double-pole-single-throw pressure switches 170, 172, and 174. Pressure switches 170, 172 and 174 are conventional hydrostatic switches designated to be closed between selected ocean depths of, for example, 2,500–3,500 feet, 5,500–6,500 feet, and 8,500–9,500 feet, respectively, but opened at all other depths. The other terminal of one of the poles of each switch 170, 172, and 174 is connected to a brush 176 of limit switch 154. One terminal of motor 114 and the other terminal of contact 168 are connected to brushes 178 and 180, respectively of limit switch 154. The remaining terminals of the other pole of each switch 170, 172 and 174, as well as the other terminal of contact 164, are connected to the remaining terminal of motor 114.

Figure 6:
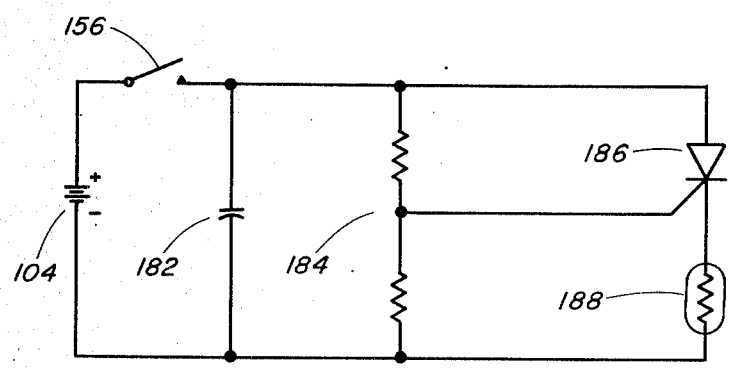
FIG. 6 is a schematic diagram of the array fairing ejector circuit.

Referring now to FIG. 6, the array fairing ejector circuit comprises sea water battery 104 connected across a storage capacitor 182 via array fairing ejector power switch 156. A voltage divider 184 is also connected across storage capacitor 182. The anode of a silicon controlled rectifier 186 is connected to one end of voltage divider 184, and the gate is connected to the center tap of the voltage divider. A conventional squib resistor 188 is connected between the cathode of silicon controlled rectifier 186 and the other end of voltage divider 184.

Referring now to FIG. 7, drive motor 82 and gear reducer and cam switch assembly 84 are shown in greater detail. Fixedly secured to lead screw shaft 86 for rotation therewith are a plurality of circular discs 190 made of or coated with an electrical insulating material. Around a selected portion of the circumference of each disc there is deposited an electrical conductor 192. A plurality of contact brushes 194 are positioned adjacent the discs so that the discs may selectively open and close the contacts upon rotation of shaft 86. Each disc and its adjacent contact brushes form an individual switch which will be referred to as limit switch 196, tone generator cut off switch 198, ane cable gripper relay actuating switch 200. The purpose of these switches will become apparent hereinafter.

FIG. 8 shows the electrical schematic diagram for the array actuation. Each terminal of sea water battery 104 is connected to one terminal of a pair of contacts 202, 204 and 206, 208 of a radio command holding relay having a holding coil (not shown). It should be noted that contacts 202 and 206 are normally closed and that contacts 204 and 208 are normally open. The other terminal of each of the normally closed contacts 202 and 206 are connected to one terminal of array actuator power switches 160. The other terminal of upper array actuator power switch 160 is connected to a brush 210 of limit switch 196. One terminal of drive motor 82 and the other terminal of contact 208 are connected to brushes 212 and 214, respectively, of limit switch 196. The remaining terminal of the lower array actuator power switch 160, as well as the remaining terminal of contact 204, are connected to the other terminal of drive motor 82. One terminal of the lower array actuator power switch 160 is connected to one terminal of a contact 216 which is part of the same holding relay as contacts 202-208. The other terminal of contact 216 is connected to one terminal of a holding coil 218 of another holding relay having a pair of normally open contacts 220 and 222. One terminal of the upper array actuator power switch 160 is connected via contact 220 to the same terminal of holding coil 218. The other terminal of holding coil 218 is connected to battery 104. Connected in parallel across holding coil 218 and contact 220, via contact 222 are a pair of contacts 224 and 226 which are part of cable gripper relay actuating switch 200 illustrated in FIG. 7.

In operation, the multiple deployment depth sonobuoy of the present invention may be launched from a tube launcher (not shown) by gravity or other suitable ejection means. In installing sonobuoy 20 in the launcher, lanyard 26 is connected to the parafloat cover ejection mechanism. Prior to launching, safety cotter key 28 is removed from the cover separation mechanism. When the sonobuoy is launched, the lanyard pays out until the sonobuoy is free of the launching tube; the lanyard then pulls a movable firing pin (not shown) against a spring (also not shown) to cock it until a plurality of retaining balls (further not shown) drop out and release the lanyard thereby releasing the cocked firing pin. The firing pin strikes a primer (not shown) which generates a gas, and the resultant pressure increase separates cannister 30 which functions as a parafloat cover. As the sonobuoy descends, air is scooped up by a conventional parafloat canopy which inflates and retards the descent of the sonobuoy. Upon entry into the water the sonobuoy pulls the inflated parafloat below the surface, but the parafloat volume is sufficiently greater to bring the sonobuoy to rest and then return to the surface from where it supports the sonobuoy.

Upon entry into the water, seawater enters battery 58 housed in surface sub-assembly 22 and initiates the activation of the battery. As can be seen in FIG. 2, as battery 58 comes up to voltage, storage capacitor 106 is charged. As the voltage across the storage capacitor rises, a voltage is applied across silicon controlled rectifier 110 and squib resistor 112 which are connected in series. However, no current flows through the squib resistor until a predetermined trigger voltage is received at the gate of the silicon controlled rectifier. The predetermined trigger voltage may be selectively varied by adjusting the center tap of voltage divider 108 which is connected across storage capacitor 108. When the voltage on the storage capacitor has reached the requisite level to provide the appropriate voltage to the gate of the silicon controlled rectifier, the energy from the storage capacitor is dumped through the silicon controlled rectifier and the squib resistor. Actuation of the squib resistor causes an explosion which releases ball detents 36 and generates gas. The resultant increase in pressure provides a positive force, in addition to gravity, for separating deep sub-assembly 24 from surface sub-assembly 22.

After separation, the deep sub-assembly descends, paying out cable 62 which has one turn wound around free-spinning roller 130. Upon separation of deep sub-assembly 24, sea water battery 104 in the deep sub-assembly is flooded. Battery 104 is the main battery of the sonobuoy, and it provides the power for the cable gripper-retardation assembly which, at the appropriate depth, decelerates and gradually terminates the descent of the deep sub-assembly.

Referring now to FIG. 3, the operation of the cable gripper-retardation assembly can be more easily understood. At the appropriate depth, which will be discussed hereinafter a control circuit power supply is applied to cable gripper motor 114. Via planetary gear reducer 116, motor 114 drives lead screw 120 which actuates clutch assembly 122. Clutch plate 128, which is biased by spring 126, is urged against roller 130 thereby bringing about a gradual retardation of the cable roller until it is brought to rest. The gradual stopping action is highly desired in the preferred embodiment because of the sensitivity of the SONAR instrumentation to impact and shock. By circuitry which will be discussed hereinafter, the power to motor 114 is cut off at the appropriate time with the clutch plate fully engaging the roller.

It can be readily seen that motor 114, via worm 118 and worm gear 132, also drive shaft 134 to which switch bank 136 is responsive. Shaft 134, via reduction gear train 138, drives lead screw 140 which actuates follower 142. Through spring 144, a force is thereby exerted on free-wheeling idler roller 146 to urge idler roller 146 against cable 62 on roller 130 to provide sufficient friction such that the cable is gripped with a gradually increasing force as the idler roller is brought up to the cable roller. The idler roller thereby keeps the cable from slipping when the deep sub-assembly is suspended at a particular depth regardless of bobbing which may occur due to currents.

Referring now to FIG. 5 wherein the apparatus is illustrated in its initial stage and the deep sub-assembly 24 is sinking, the operation of the control circuit may be more readily understood. When the deep sub-assembly reaches a depth of 2,500 feet below the surface, double-pole-single throw pressure switch 170 closes. Power is applied from battery 104 through normally closed contact 162, through the upper pole of switch 170, through limit switch 154 via brushes 176 and 178 thereof, through motor 114, through the lower pole of switch 170, and through normally closed contact 166. Motor 114 continues to run until it is stopped by limit switch 154 when brushes 176 and 178 are open circuited. Limit switch 154 may be preset to allow the deep sub-assembly to drop 500 feet more before opening. The spring loading of clutch 122 and idler roller 146 permits broad tolerances in the preset timing of limit switch 154. The clutch and the associated gear reducer should be preset to allow the deep sub-assembly to drop 500 feet after initial actuation so it will initially stop at 3,000 feet and motor 114 is cutoff shortly thereafter. Thus the deep sub-assembly is brought to rest at the first predetermined depth of, for example, 3,000 feet.

Referring to FIG. 4, it may be seen that, as discs 148 rotate clockwise during the previously discussed operation, array fairing ejector power switch 156 is closed just prior to the opening of brushes 176 and 178 of limit switch 154. As can be seen in FIG. 6, when switch 156 is closed, power is applied from battery 104 across storage capacitor 182. As energy in the capacitor rises, a rising voltage is applied across silicon controlled rectifier 186 and squib resistor 188 which are series connected. However, no current flows through the squib resistor until a predetermined trigger voltage is received at the gate of the silicon controlled rectifier. The predetermined trigger voltage may be selectively varied by adjusting the center tap of voltage divider 184 which is connected across storage capacitor 182. When the voltage on the storage capacitor has reached the requisite level to provide the appropriate voltage to the gate of the silicon controlled rectifier, the energy from the storage capacitor is dumped through the silicon controlled rectifier and squib resistor 188. This current flow actuates squib 72, illustrated in FIG. 1, causing an explosion, gas generation, and a pressure increase within explosive bolt 66. The pressure increase causes explosive bolt 66 to shear off at weakend portion 68 provided by V-groove 70 and further provides a positive force, in addition to gravity, for separating array fairing 64 from the deep sub-assembly. As can be seen in FIG. 4, switch 156 opens prior to completion of the cable gripper operation, and it serves no further purpose during the operation since the squib resistor becomes an open circuit after actuation.

As may be seen in FIG. 4, just prior to the cut off of motor 114 by limit switch 154, tone generator power switch 158 is closed and remains closed while the motor is off. This switch thusly applies power from battery 104 to tone generator 98 by conventional circuitry (not shown); the tone generator transmits a tone to aircraft circling above to indicate the start of the array erection sequence. This tone continues until the hydrophone array is completely erected. Shortly before the closing of tone generator power switch 158, array actuator power switches 160 are also closed.

Referring now to FIG. 8 wherein the circuit is illustrated in the array retracted position, the control circuit for the array erection is illustrated. Power from battery 104 is applied through normally closed contact 202, through the upper array actuator power switch 160, through limit switch 196 via brushes 210 and 212, through motor 82, through the lower array actuator power switch 160, and through normally closed contact 206. Motor 82 continues to run until it is stopped by limit switch 196 when brushes 210 and 212 are open circuited and the array is fully extended.

As can be seen in FIG. 1, drive motor 82, via gear reducer and cam switch assembly 84, drives lead screw 86. Threaded follower 92 moves up the lead screw in the direction of motor 82, and, via pivot arm 94, causes a plurality of hydrophone arms 74 to pivot about pin connection 76 until the hydrophone arms are in the horizontal, extended position at which point motor 82 is cut off by limit switch 196. As the hydrophone arms rotate to the horizontal extended position, weighted hydrophone staves 78 rotate about a pin connection so as to be in a vertical position. As can be seen in FIG. 7 wherein the apparatus is shown when the array is in the array extended position, during the array erection, discs 190 are rotated clockwise. When the array erection is completed due to the open circuit between brushes 210 and 212 of limit switch 196 as illustrated in FIG. 7, the brushes of tone generator cut off switch 198 are open circuited thereby terminating the transmitted tone to indicate to the circling aircraft that the array erection sequence is completed and that the SONAR system is ready for use.

In this position the sonobuoy can listen passively on selection of the passive mode by the operator. If an active search is selected by the operator, an explosive charge should be detonated at the same depth as the deep sub-assembly to fully exploit SIDECAR as previously discussed, and this may be accomplished by a number of conventional techniques. It should be understood that the actual listening technique itself, either in the active or passive mode, forms no part of the present invention. Upon completion of the listening process, a radio command is given from the circling aircraft to actuate the holding relay of contacts 202–208 and 216 thereby switching and holding those contacts in their second position for a predetermined time after which they are released. With relays 202–208 in their second positions, current is passed through motor 82 in the opposite direction in the following manner: power is applied from battery 104, through normally open but now closed contact 204, through motor 82, through limit switch 196 via brushes 212 and 214, and through normally open but now closed contact 208.

Application of voltage to motor 82 in the opposite direction causes the motor to rotate in the opposite direction; the reverse rotation of lead screw 86 causes threaded follower 92 to move down the lead screw away from motor 82 thus rotating hydrophone arms 74 back to the vertical, closed position. The retraction continues until the circuit is broken by an open circuit in limit switch 196 between contacts 212 and 214.

Simultaneously with the array retraction sequence, power is applied from battery 104, through contact 204, through normally open but now closed contact 216, and through holding coil 218. The action of holding coil 218 is such as to close normally open contacts 220 and 222, and thus a voltage is applied across contacts 224 and 226. When contacts 202–208 and 216 are released after a predetermined time, contact 202 is conventionally designed to close just before contact 216 opens. In this manner, power is also applied from battery 104, through contact 202, through switch 160, through contact 220, and through holding coil 218 so that the holding coil remains energized after contacts 202–208 and 216 have returned to their normal positions.

Upon completion of the array retraction, cable gripper relay actuation switch 200 is closed and the power applied across contacts 224 and 226 energizes a coil (not shown) to operate the relay of contacts 162–168. With these contacts thrown, current is passed through cable gripper motor 114 in the opposite direction in the following manner: power is applied from battery 104, through normally open but now closed contact 164, through cable gripper motor 114, through limit switch 154 via contacts 178 and 180, and through normally open but now closed contact 168. Application of voltage to motor 114 in the opposite direction causes the motor to rotate in the opposite direction thereby gradually releasing the cable and allowing the deep sub-assembly to sink. When the deep sub-assembly reaches 3,500 feet, pressure switch 170 opens and shortly thereafter, array actuator power switches 160 open. When the upper array actuator power switch in FIG. 8 is opened, current ceases to flow in holding coil 218 thereby releasing contacts 220 and 222 which in turn release contact 162–168. Thus, all relays have returned to their initial positions and the deep sub-assembly is sinking to its second predetermined depth, and one cycle of the operation has been completed. It should be apparent that the remaining cycles operate similarly with switches 172 and 174, and even more if desired, causing the deep sub-assembly to rest at a plurality of intermittent depths of, for example, 6,000 and 9,000 feet or deeper.

Obviously, numerous modifications and variations of the present invention are possible in the light of The above teachings.

What is claimed as new and desired to be secured by Letters Patent of the United States is:

1. In an underwater acoustical detection system, the combination comprising:

a multiple deployment depth sonobuoy having a submerged portion, and means operatively coupled to said sonobuoy for sequentially suspending said submerged portion of said sonobuoy at a plurality of predetermined discrete ocean depths.

2. The combination of claim 1 wherein said suspending means comprises:

a cable having one end thereof capable of being secured to a floating body, and means secured to the other end of said cable and to said submerged portion of said sonobuoy for selectively paying out a predetermined discrete length of said cable.

3. The combination of claim 2 wherein said means for paying out said cable comprises:

a free-wheeling roller about which said cable is wound, and means for preventing rotation of said free-wheeling roller.

4. The combination of said claim 3 wherein said means for preventing rotation of said free-wheeling roller comprises means for gradually preventing rotation of said free-wheeling roller.

5. The combination of claim 3 wherein said means for preventing rotation of said free-wheeling roller comprises a spring-loaded clutch engageable with said free-wheeling roller.

6. The combination of claim 5 wherein said means for preventing rotation of said free-wheeling roller further comprises a reversible D.C. motor by which said spring-loaded clutch is driven.

7. The combination of claim 3 wherein said means for paying out said cable further comprises spring-loaded idler roller means for selectively urging said cable against said free-wheeling roller.

8. The combination of claim 7 wherein said means for paying out said cable further comprises means for actuating said idler roller means in response to the prevention of rotation of said free-wheeling roller.

9. The combination of claim 6 wherein said means for selectively paying out a predetermined discrete length of said cable further comprises electrical circuit means for selectively applying a voltage to said D.C. motor intermittently and alternately in opposite polarity.

10. The combination of claim 9 wherein said electrical circuit means comprises:

a power source, and a plurality of parallel hydrostatic pressure responsive switches serially connected between said power source and said D.C. motor.

* * * * *